United States Patent [19]

Graham et al.

[11] 4,442,606

[45] Apr. 17, 1984

[54] DIGITAL GONIOMETER

[76] Inventors: Douglas A. Graham, 13 N. Maryland Ave.; Douglas G. Baillet, 16 Oakland Dr., both of Port Washington, N.Y. 11050; Mark Sankey, 18 Henshaw Ter., Newton, Mass. 02165

[21] Appl. No.: 367,578

[22] Filed: Apr. 12, 1982

[51] Int. Cl.³ .................. G01B 3/56; G01B 5/24; G01B 7/30
[52] U.S. Cl. .................. 33/1 N; 33/1 PT; 33/471
[58] Field of Search ............. 33/1 L, 1 N, 1 PT, 421, 33/465, 468, 471, 495, 500, 430

[56] References Cited

U.S. PATENT DOCUMENTS

| 1,524,730 | 2/1925 | Cain | 33/471 |
|---|---|---|---|
| 2,966,743 | 1/1961 | Doudlah | 33/1 N |
| 3,270,420 | 9/1966 | Simril | 33/471 |
| 3,996,670 | 12/1976 | Joyal et al. | 33/1 PT |
| 4,119,212 | 10/1978 | Flemming | 33/1 N |
| 4,246,703 | 1/1981 | Robinet | 33/430 |
| 4,249,314 | 2/1981 | Beck | 33/1 PT |

FOREIGN PATENT DOCUMENTS

| 2741978 | 3/1979 | Fed. Rep. of Germany | 33/471 |
| 119749 | 4/1927 | Switzerland | 33/471 |

*Primary Examiner*—Richard R. Stearns
*Attorney, Agent, or Firm*—Richard L. Miller

[57] ABSTRACT

A electro-mechanical device for measuring the angle made by two rotatably joined members comprising a pair of rotatably connected elongated arms and electrical circuit means mounted on one of the arms and associated with the rotatable pin connector of the arms. The circuit, powered by a battery, encodes the angle of the pin preferably via a potentiometer and transmits the information to a decoding device, preferably a voltmeter, and then to a digital display device also mounted on one of the arms.

6 Claims, 4 Drawing Figures

DIGITAL GONIOMETER

BACKGROUND OF THE INVENTION

This invention relates generally to an electromechanical device or system for measuring a selected angle of a range of angles. More specifically, the invention relates to a device for measuring an angle made by two bones connected at a common joint and which rotate approximately in the same plane.

It is a common practice for doctors to set a cast for a broken bone, for example, by means of a mechanical device which shows a reading for the angle at which the broken bone is set in relation to a second bone being set in the same cast and to which the broken bone is rotatably connected. Such devices are also used extensively in the fields of occupational therapy, physical therapy, sports medicine, and many other related areas.

The main disadvantage of goniometers presently being used is that they are purely mechanical and the angles they measure must be read from them in the manner of reading a protractor.

SUMMARY OF THE INVENTION

It is a principle object of the present invention to provide an electro-mechanical device for immediately reading an angle made between rotatably connected members from a digital display mounted on the device.

It is a further object of the present invention to provide an electro-mechanical system having a pair of rotatably connected arms having an electrical circuit capable of transmitting an electrical signal to a digital display mounted on one of the arms corresponding to the selected angle at which the arms are positioned relative to one another.

It is yet another object of the present invention to provide an electro-mechanical device that can be set at a selected angle the number of angular degrees of which is immediately transmitted to a digital display contained by the device.

Further objects of the invention will appear as the description proceeds.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWING FIGURES

The figures of the drawings are briefly described as follows:

FIG. 1 is a front perspective view of the invention.
FIG. 2 is a front view of the invention in use.
FIG. 3 is a bottom view of the invention.
FIG. 4 is a block diagram of the invention.

DETAILED DESCRIPTION OF THE PREFERRED EMBODIMENT

Figure 1:
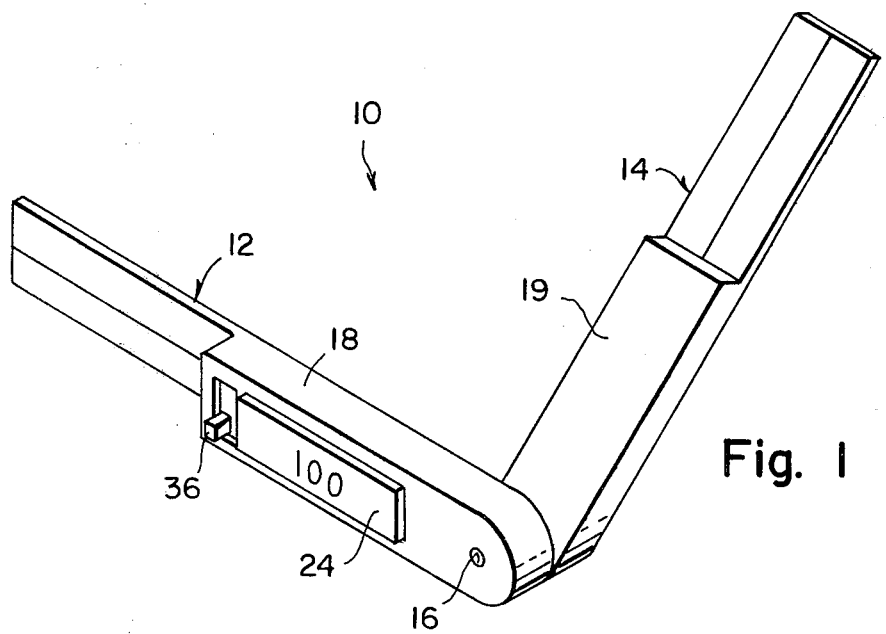

Reference is now made in detail to the drawing.

An electro-mechanical system 10 for measuring an angle according to the present invention is illustrated in a perspective view in FIG. 1. A pair of elongated arm members 12 and 14 are rotatably attached at one of the ends of each by pin 16. At least one side of each arm member is straight so that when both arms are rotated so that an angle of 0 angular degrees is formed between them, at least one straight side is formed. As illustrated, both opposing sides of each arm are approximately straight and parallel and in line with the side of the other arm when the angle is 0 (or 180) degrees.

Arm 12 has a compartment portion 18 which is hollow. Arm 14 is shown as having a similar compartment 19 for aesthetic purposes. Preferably clear plastic portions 21 and 23 extend longitudinally from compartments 18 and 19 respectively. Centerlines 25 preferably are positioned along the top of each portion 21 and 23. Compartment 18 is set over rotatable connection, or pin 16. An electrical circuit is housed within compartment 18 for the purpose of measuring an angle formed by arms 12 and 14 as selected by the user. Preferably, any angle between 0 and 360° may be selected. As will be described below, an electrical circuit for processing the selected angle into an electrical signal to be digitally displayed on readout, device 22 is mounted in compartment 18. Digital readout device 22 receives receiving the electrical signal noted above and processes it into a digital form of the selected angle for displaying the digital form on digital display 24. For purposes of illustration, FIG. 1 shows a digital form display of 100 degrees.

Figure 2:
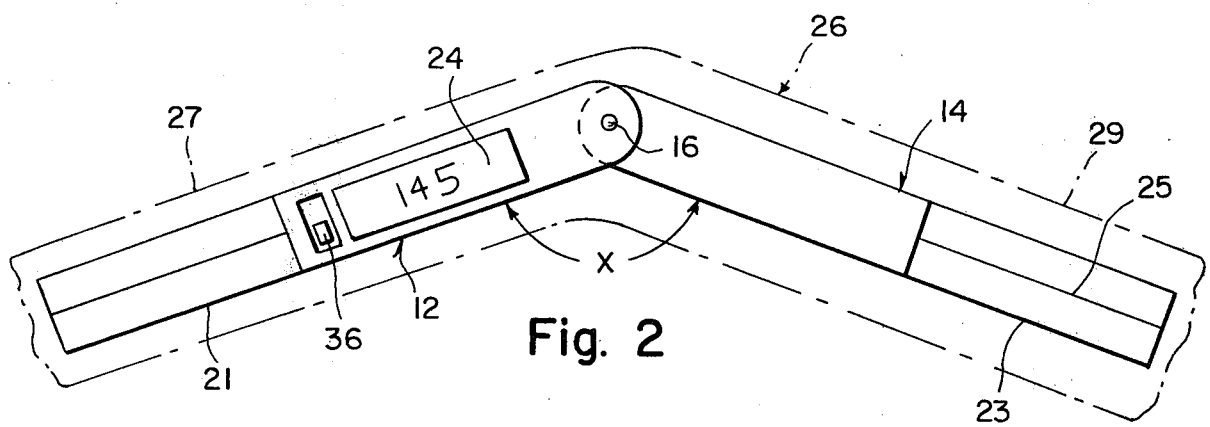

FIG. 2 shows system 10 being angled against an object 26 that includes two limbs, 27 and 29, connected at a common joint (not shown) that rotate in approximately the same plane, such as a leg, that is bent at an angle X, which, as indicated on the digital display, as 145 degrees.

Figure 3:
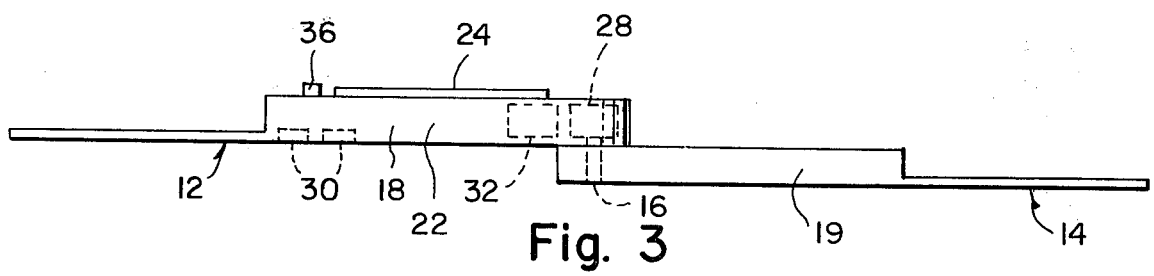
Figure 4:
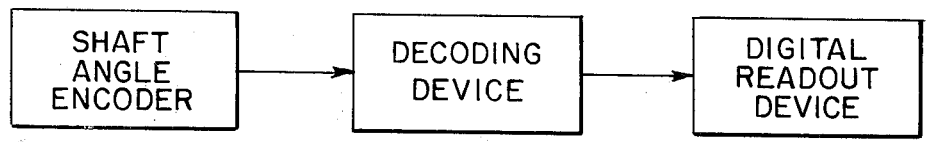

FIG. 4 shows a logic block diagram of a portion of the electrical circuit described above including a shaft angle encoder and a decoding device. The shaft angle encoder may be any type of encoder but is preferably potentiometer 28 connected to pin 16 as shown in bottom view FIG. 3. In a manner known in the art, the potentiometer would preferably draw a negible amount of current. As is also well known in the art the potentiometer would be connected across a suitable reference voltage source, and a conventional digital voltmeter circuit would be used to measure the voltage between one end of the potentiometer and the wiper arm. The choice of a proper voltmeter gain constant would allow the voltmeter to read out degrees, or radians directly. When the two arms are rotated to adjoining positions, the output of the potentiometer output is 0 volts. Then, as the arms are rotated apart, the potentiometer output voltage would steadily increase on a straight line increase up to 360 degrees.

The source of the voltage is a battery or preferably a group of batteries 30 and a suitable voltage regulating circuit as is well known in the art, mounted in compartment 18. Voltage source 30 passes full voltage to potentiometer 28, which in turn passes a portion of the voltage proportional to the angle being measured, here angle X, to the decoder, shown as preferably voltmeter 32, which is preferably an integrated circuit voltmeter, which in turn receives, decodes, and processes the received signal. The voltmeter in turn operates a digital readout device 22, in a manner known in the art. The voltmeter scale is transposed so as to indicate angular degrees in a digital form, in this case 145, and displaying the digital form in digital display 24. The mode of the digital display form is preferably either a light emitting diode (LED) or liquid crystal display (LCD). Switch 36 is mounted on compartment 18 and is capable of switching the voltage of batteries 30 to potentiometer 28 into either on or off modes.

While certain novel features of this invention have been shown and described and are pointed out in the annexed claims, it will be understood that various omissions, substitutions and changes in the forms and details of the device illustrated and in its operation can be made by those skilled in the art with out departing from the spirit of the invention.

What is claimed is:

1. A system for measuring an angle, in combination comprising:

first and second elongated arm members, each arm member being substantially similar in structure to the other and each comprising a flat bottom surface, a pair of opposing parallel flat side edges, a rectangular housing portion forming the medial half thereof, a clear plastic flat rectangular plate portion longitudinally extending from the housing portion and forming the distal half thereof, and a longitudinal centerline positioned along the plate portion, the housing of one of said arm members including a hollow compartment;

pin means for pivotally coupling said arm members together at their medial ends, said pin means extending through both said housing portions;

potentiometer means located in said hollow compartment and associated with said pin means for providing an electrical signal indicative of the angle formed between said arm members;

battery means located in said hollow compartment for providing a source of reference voltage to said potentiometer means;

decoding means located in said hollow compartment for translating said electrical signal into a desired angular measurement of the angle formed between said arm members; and digital display means on the housing of said one arm for displaying the angular measurement provided by said decoding means, whereby said arm members form straight side edges at angles of 0 degrees, 180 degrees, and 360 degrees, and said display can display the angle between 0 and 360 degrees.

2. A system for measuring an angle according to claim 1, wherein said decoding means comprises a voltmeter.

3. A system for measuring an angle according to claim 2, wherein said voltmeter is an integrated circuit voltmeter.

4. A system for measuring an angle according to claim 3, wherein said digital display means is a liquid crystal display.

5. A system for measuring an angle according to claim 3, wherein said digital display means is a light emitting diode.

6. A system for measuring an angle according to claim 3, further including means for switching said voltage reference source between on and off modes.

* * * * *